United States Patent
Irten et al.

(10) Patent No.: US 6,308,075 B1
(45) Date of Patent: Oct. 23, 2001

(54) METHOD AND APPARATUS FOR ROUTING SHORT MESSAGES

(75) Inventors: Kerem Irten, Stratford; Atakan Yalcinkaya, New Haven, both of CT (US); David Brukman, Cherry Hill, NJ (US)

(73) Assignee: ADC Telecommunications, Inc., Minneapolis, MN (US)

( * ) Notice: Subject to any disclaimer, the term of this patent is extended or adjusted under 35 U.S.C. 154(b) by 0 days.

(21) Appl. No.: 09/072,527

(22) Filed: May 4, 1998

(51) Int. Cl.[7] .................................................... H04Q 7/24
(52) U.S. Cl. ......................... 455/466; 455/426; 455/445; 379/221.14
(58) Field of Search ..................................... 455/411, 466, 455/437, 418, 426, 445; 370/252, 400, 475; 379/221.08, 221.09, 221.1, 221.14

(56) References Cited

U.S. PATENT DOCUMENTS

| | | | | |
|---|---|---|---|---|
| 5,768,509 | * | 6/1998 | Gunluk | 709/203 |
| 5,793,752 | * | 8/1998 | Clarke et al. | 370/252 |
| 5,878,397 | * | 3/1999 | Stille et al. | 455/466 |
| 5,887,249 | * | 3/1999 | Schmid | 455/411 |
| 5,905,958 | * | 5/1999 | Houde | 455/437 |

* cited by examiner

Primary Examiner—Lee Nguyen
(74) Attorney, Agent, or Firm—Schwegman, Lundberg, Woessner & Kluth, P.A.

(57) ABSTRACT

A system for routing short messages between message centers provides that messages are first checked to see if they are to be handled by the local message center, and then routed, if appropriate, to another message center using point code or global title translation routing.

6 Claims, 4 Drawing Sheets

METHOD AND APPARATUS FOR ROUTING SHORT MESSAGES

COPYRIGHT NOTICE/PERMISSION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to the software and its interfaces as described below and in the drawing hereto: Copyright© 1998, ADC NewNet, Inc. All Rights Reserved.

TECHNICAL FIELD OF THE INVENTION

The present invention relates generally to mobile telephone systems, and more particularly to method and apparatus for routing short messages between multiple message centers.

BACKGROUND OF THE INVENTION

The Short Message Service for IS-41 (ANSI-41) mobile networks is defined in the ANSI/EIA/TIA standard starting with version C (also known as IS-41-C) (See ANSI/EIA/TIA Standard 41-D, *Cellular Radio-Telecommunications Intersystem Operations*, Electronics Industries Association, 1997) ("IS-41D Specification"). This document defines network entities called Mobile Centers (MCs) which are responsible for receiving, storing and forwarding short messages from and to Short Message Entities (SMEs). In most cases, these entities correspond to mobile handsets (MSs), and are formally defined as MS-based SMEs. In some cases, these SMEs can be based on the mobile center or other network nodes, and are known as fixed SMEs.

The underlying transport layer for IS-41 messages is usually SS7. The IS-41 entities in the SS7 network are addressed using Point Code/Subsystem Number (PC/SSN) identifiers. On the other hand, short messages are addressed using MINs (Mobile Identification Numbers) or DNs (Destination Numbers). corresponding to the telephone numbers of the mobile handset.

In general, the short message is delivered to an MC, which stores the message. The MC will attempt to deliver a message during a certain period. Since the destination may be temporarily unreachable (e.g., the subscriber's handset is out of range), the MC may attempt to deliver several times. The standard also allows one MC to forward the message to another MC, which will actually make the delivery.

The signaling procedures for standard MC interworking are specified in Section 6 of the IS-41D Specification. Section A4.46.6 MC Receiving and SMSDeliveryPointToPoint INVOKE@ describes in pseudo-code how a short message is treated by an MC. There are three actions that while mentioned are not specified:

1) How to determine if the original originating address is a SME homed to the local MC 10 (step 1-16-1).

2) How to determine if the destination address is a SME homed to this MC 10 (step 1-17-1).

3) How to determine where to forward the message (step 1-16-1-3, referring to procedure 4.46.7).

Thus, the standard ([IS41D]) does not specify how to determine the home MC or how to route (that is, how to determine the PC/SSN address) a short message from one MC to another. In their book entitled *Mobile Telecommunication Networking with IS-41*, (McGraw-Hill, 1997), Michael D. Gallagher and Randall A. Snyder discuss the routing for forwarding the short message between two MCs. Their suggestions are fixed MIN-to-MC table (similar to the internal MC route table described below) or MIN-to-MC Global Title Translation (GTT). While Gallagher and Snyder describe how to do routing, they offer no solution for making the home MC determination.

SUMMARY OF THE INVENTION

One embodiment of the invention offers a flexible approach for determining whether a given subscriber is homed to the local MC. The combination of subscriber database profiles and default subscriber profiles allows the customer to implement schemes such as white-listing (only explicitly provisioned subscribers receive service), black-listing (all receive service except those explicitly disallowed in the database), or some combination.

In addition, one embodiment of the invention offers a flexible routing mechanism which allows a combination of point code and global title translation routing. Furthermore, the invention allows the customer to try to deliver a message directly if the forwarding fails (for instance of the destination's home MC is unknown or consistently unreachable).

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Figure 1:
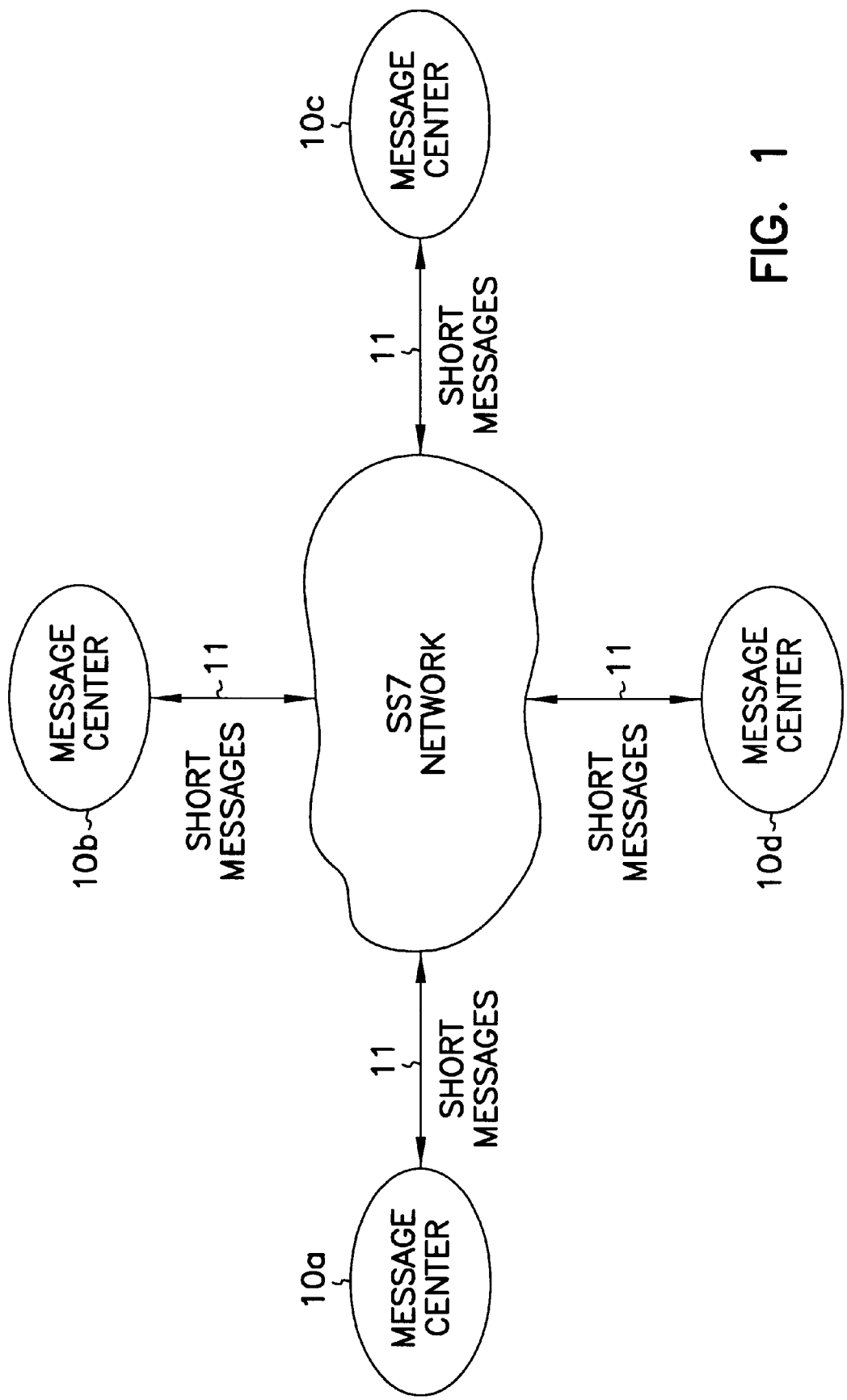
FIG. 1 illustrates a plurality of message centers interconnected with an SS7 signaling network.

Referring now to FIG. 1, there is illustrated a plurality of message centers 10a–10d, interconnected with an SS7 network 12, which includes SS7 links 11. As described herein, message centers 10 transfer short messages between one another over the SS7 network. In this example embodiment of the invention, short messages are transported and delivered in accordance with the Short Message Service for IS-41 (ANSI-41) mobile networks as specified above. Although described herein in the form of an SS7 network, other transport architectures may also be used for the purpose of transporting short messages.

Figure 2:
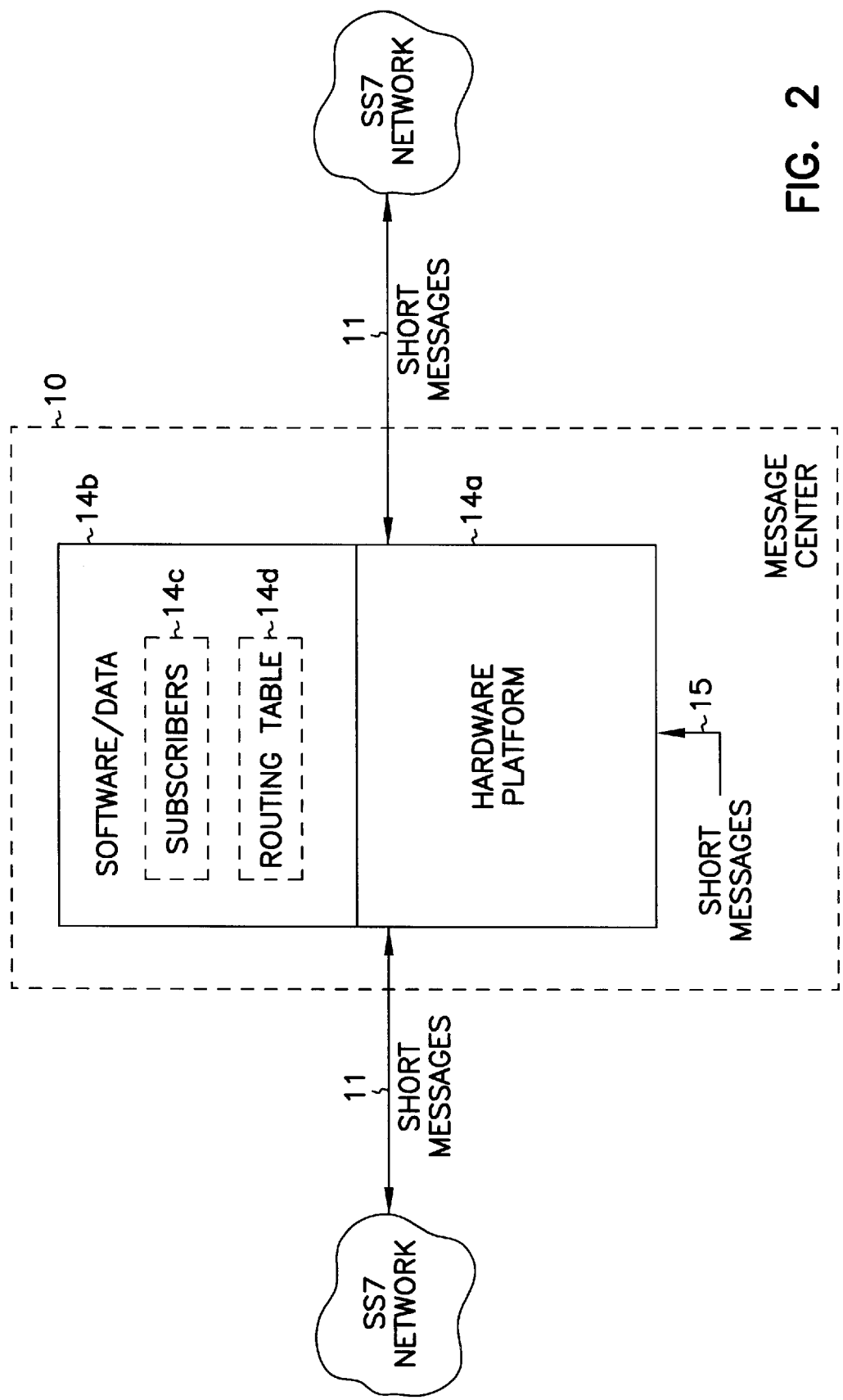
FIG. 2 illustrates a message center processing system in simplified form.

Referring now to FIG. 2, there is illustrated in simplified form a short message processing system 13, according to one example embodiment of the invention. As illustrated, short messages are received at processing system 13 from an SS7 link 11, or from another source over port 15, that may originate from within or without the message center 10. System 13 includes a hardware platform 14b and software components 14b. System 13 further includes a subscriber database 14c, maintaining a list of subscribers served by the message center 10, and also a routing table 14d, pursuant to conventional IS-41 operation. Hardware platform 14*a* is preferably a workstation computer configured to provide a physical layer connection to the SS7 links 11 and to other external devices and networks. Software components 14*b* preferably include a UNIX type or equivalent multitasking operation system, and other software for implementing control functions for message processing, for example as illustrated with respect to the flow chart of FIGS. 3A and 3B.

Figure 3A:
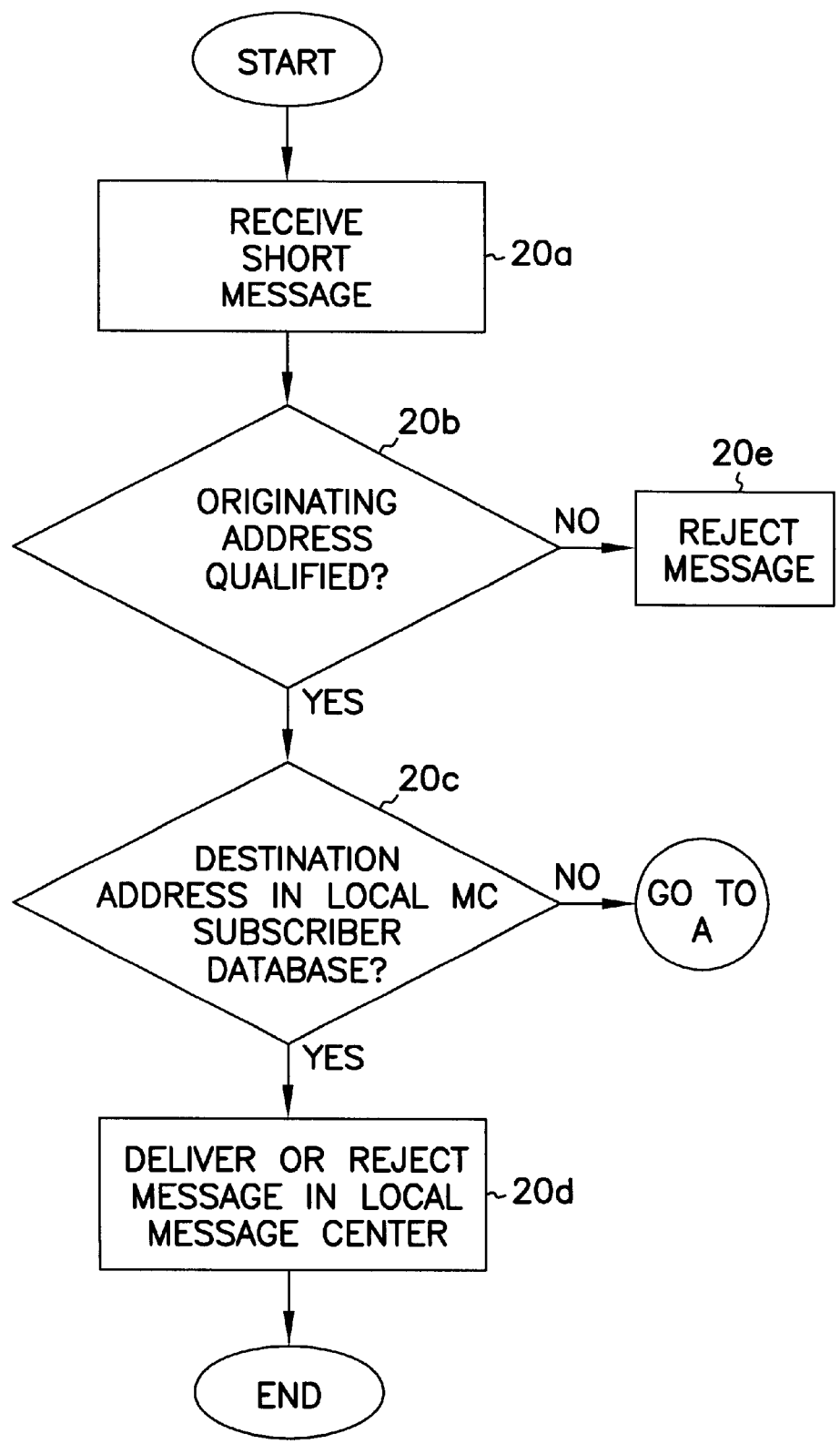
FIGS. 3A and 3B illustrate the software and corresponding process for processing short messages according to one example embodiment of the invention.
Figure 3B:
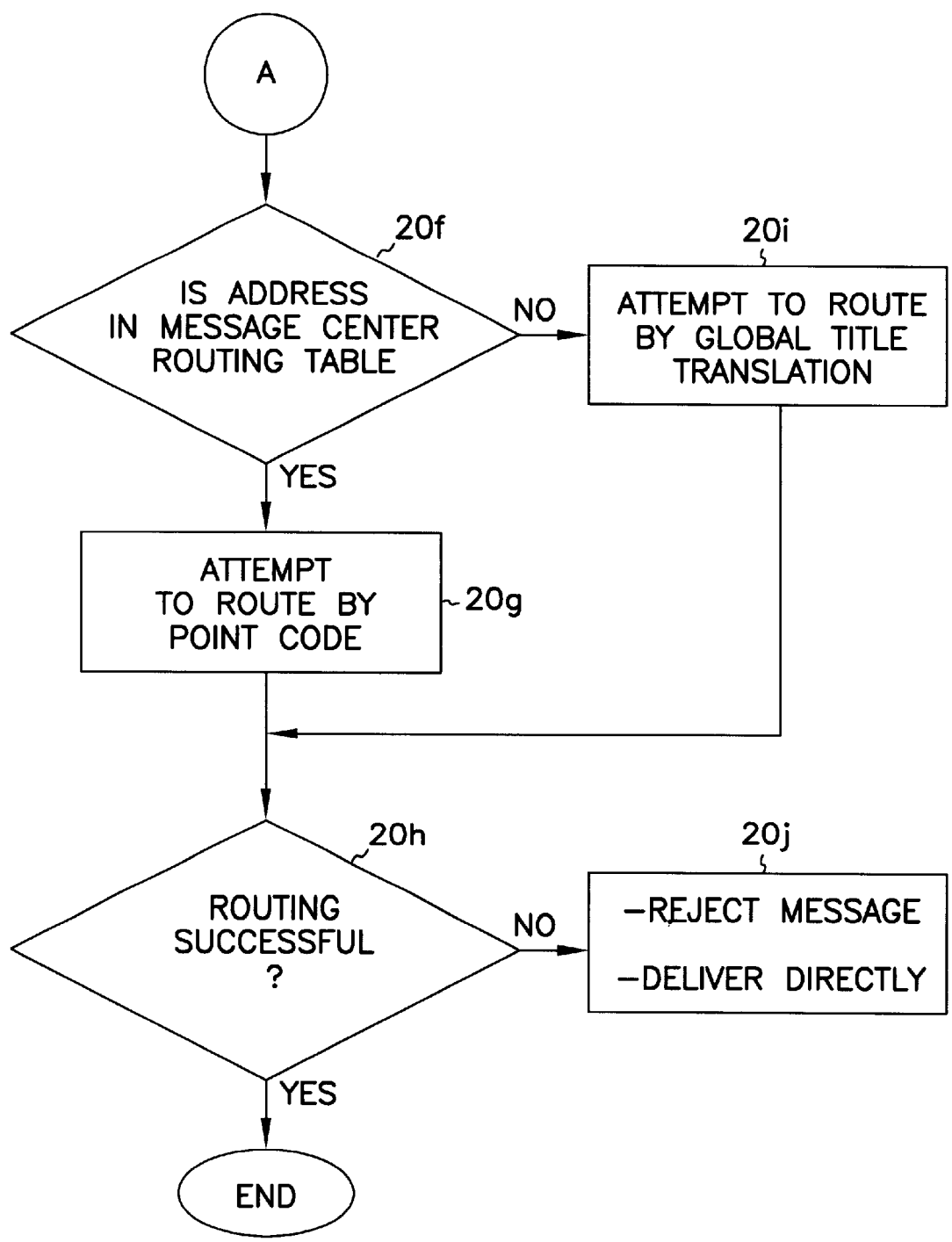

Referring now to FIGS. 3A and 3B, there is described one embodiment of the message processing method and software of the invention. A short message is received at the processing system 13 (20*a*). A check is made to see if the message is qualified (20*b*), and if not, it is rejected or otherwise processed (20*e*). Qualifying the message is not essential to the invention, but may be done by determining if the originating address (phone number of originating program or handset) matches a specific profile in the local subscriber database 1*c*, with the profile determining whether the message is accepted for processing or rejected. If the subscriber database 14*c* does not have a match, a default subscriber profile can be used to determine whether the message is accepted for processing or rejected.

If the message is accepted for processing, it is determined whether the destination address is homed to the local MC 10. More particularly, if the destination address (phone number of destination program or handset) matches a specific profile in the local subscriber database 14*c* (20*c*), the profile determines whether the message will be delivered directly (following standard [IS41D] procedure) or rejected (20*d*).

Otherwise, the message is forwarded to the home MC 10 of the destination. If the point code (PC)/sub-system number (SSN) of the destination's home MC 10 is in the MC route table (14*d*) (20*f*), then the short message is forwarded to the destination MC 10 using the PC/SSN (20*g*).

Otherwise, global title translation (GTT) is attempted for MC 10 routing (20*i*), and if successful the message will be forwarded to the destination's home MC 10 using the destination address and MIN-to-MC translation.

Alternatively, the invention may be embodied such that only one of the above routing procedures is configured, (i.e. either routing by point code or by GTT), or routing is done by first trying one routing technique, and then the other if the first is not achievable.

If any event the forwarding step fails (20*h*) (for instance of the destination's home MC is unknown or consistently unreachable), the default subscriber profile determines whether the message will be delivered directly or rejected (20*j*).

Alternate Embodiments

The present invention is in no way limited to the example embodiment described herein. The invention is not limited to any type or form of software. Nor is it limited to any particular type of hardware or operating system platforms, or client-server or network architecture. Moreover, the messaging system of the invention may also be implemented in alternate ways without departing from the scope of the invention. Furthermore, the software of the invention may also be implemented in whole or in part in hardware, and vice versa.

Conclusion

Thus, the present invention offers a flexible approach for determining whether a given subscriber is homed to the local MC. The combination of subscriber database profiles and default subscriber profiles allows the customer to implement schemes such as white-listing (only explicitly provisioned subscribers receive service), black-listing (all receive service except those explicitly disallowed in the database), or some combination. In addition, the invention offers a flexible routing font mechanism which allows point code routing, GTT routing, and a combination of the two. Furthermore, the invention allows the customer to try to deliver a message directly if the forwarding fails.

What is claimed is:

1. A method of processing a short message in an SS7 network, comprising:

receiving a short message at a local message center computer system;

checking a message center subscriber database in the computer system to determine if the message is addressed to the message center such that the message is to be delivered under control of the message center;

if the message is not addressed to the local message center, looking for the address of the destination message center in a message center routing table in the computer system;

if the address is in the routing table, routing the message to the destination message center according to a point code addressing; and if the address is not in the routing table, routing the message to the destination message center by global title translation addressing.

2. A method according to claim 1 further including the step of the local message center attempting to directly deliver a short message which could not be delivered to its proper destination message center.

3. A program product comprising a computer program encoded in a machine readable medium, the computer program including program code executable on a suitably configured computer to process a short message in an SS7 network, according to the following steps:

receiving a short message at a local message center computer system;

checking a message center subscriber database in the computer system to determine if the message is addressed to the message center such that the message is to be delivered under control of the message center;

if the message is not addressed to the local message center, looking for the address of the destination message center in a message center routing table in the computer system;

if the address is in the routing table, routing the message to the destination message center according to a point code addressing; and if the address is not in the routing table, routing the message to the destination message center by global title translation addressing.

4. A product according to claim 3 further wherein the computer code is operative on the computer to attempt to directly deliver a short message which could not be delivered to its proper destination message center.

5. A computer system for processing short messages in an SS7 network, comprising:

a hardware platform;

one or more software components executing on the hardware platform for checking a local message center subscriber database in the computer system to determine if the message is addressed to the local message center such that the message is to be delivered under control of the message center;

if the message is not addressed to the local message center, looking for the address of the destination message center in a message center routing table in the computer system;

if the address is in the routing table, routing the message to the destination message center according to a point code addressing; and if the address is not in the routing table, routing the message to the destination message center by global title translation addressing.

6. A product according to claim 5 further wherein the computer program components include code which is operative on the computer to attempt to directly deliver a short message which could not be delivered to its proper destination message center.

* * * * *